US008006228B2

(12) United States Patent
Buskens et al.

(10) Patent No.: US 8,006,228 B2
(45) Date of Patent: Aug. 23, 2011

(54) FIRST AND SECOND MANAGER COMPONENTS THAT PERFORM ONE OR MORE FIRST AND SECOND MANAGEMENT OPERATIONS ON A SOFTWARE AND/OR HARDWARE ENTITY

(75) Inventors: Richard Wayne Buskens, Robbinsville, NJ (US); Oscar J. Gonzalez, Bridgewater, NJ (US); Tim Thengsen Liim, Holmdel, NJ (US); Sunil K. Mishra, Aurora, IL (US); Muhammad A. Siddiqui, Monmouth Junction, NJ (US)

(73) Assignee: Alcatel Lucent, Paris (FR)

( * ) Notice: Subject to any disclaimer, the term of this patent is extended or adjusted under 35 U.S.C. 154(b) by 469 days.

(21) Appl. No.: 10/768,308

(22) Filed: Jan. 30, 2004

(65) Prior Publication Data
US 2005/0172266 A1    Aug. 4, 2005

(51) Int. Cl.
    *G06F 9/44* (2006.01)
(52) U.S. Cl. ........................................................ 717/120
(58) Field of Classification Search .................... 717/120
    See application file for complete search history.

(56) References Cited

U.S. PATENT DOCUMENTS

| 6,408,399 | B1 * | 6/2002 | Baughman ........................ 714/4 |
| 7,061,858 | B1 * | 6/2006 | Di Benedetto et al. ....... 370/219 |
| 2003/0058796 | A1 * | 3/2003 | Anderson, Sr. ............... 370/236 |
| 2004/0153624 | A1 * | 8/2004 | Zhou et al. ........................ 712/4 |
| 2004/0199811 | A1 * | 10/2004 | Rathunde et al. ............... 714/10 |

OTHER PUBLICATIONS

"Definitions of Legacy system on the Web", http://www.google.com/search?hl=en&defl=en&q=define:Legacy+system&sa=X&ei=4XZATOzIJMGAIAeu-_DZDg&ved=0CBIQkAE, retrieved on Jul. 16, 2010.*
"Concurrent computing", http://en.wikipedia.org/wiki/Concurrent_computing, retrieved from http://en.wikipedia.org/wiki/Concurrent_computing on Jul. 16, 2010.*
Lucent Technologies Inc., "Statement Disclosing Information About Development and Use of Technology", 2002 to 2004, 3 pgs., Murray Hill, NJ, USA.

* cited by examiner

*Primary Examiner* — Philip Wang
(74) *Attorney, Agent, or Firm* — Carmen Patti Law Group, LLC

(57) ABSTRACT

An apparatus in one example comprises a first manager component that performs one or more first management operations on a software and/or hardware entity and a second manager component that performs one or more second management operations on the software and/or hardware entity.

21 Claims, 1 Drawing Sheet

FIRST AND SECOND MANAGER COMPONENTS THAT PERFORM ONE OR MORE FIRST AND SECOND MANAGEMENT OPERATIONS ON A SOFTWARE AND/OR HARDWARE ENTITY

TECHNICAL FIELD

The invention relates generally to software and/or hardware and more particularly to software and/or hardware entity management.

BACKGROUND

A manager component in one example controls one or more software and/or hardware entities. For example, the manager component is responsible for starting, stopping, initializing, and monitoring the entity, detecting failures of the entity, recovering the entity, and propagating state changes about the entity. In one example, the entity operates in a high availability domain. So, the manager component comprises high availability services software. In another example, the entity operates outside of the high availability domain. So, the entity does not interact with the high availability services software.

The software and/or hardware entity in one example comprises one or more software and/or hardware components (e.g., software and/or hardware sub-entities). The manager component has control of all management operations on the software and/or hardware entity and the software and/or hardware components. For example, the manager component maintains autonomous control of the software and/or hardware entity.

Some circumstances exist where autonomous control is either undesirable or impossible. In one example, upon introduction of new high availability services software into a legacy system, the new high availability services software must interoperate with the old high availability services software already in the legacy system. As one shortcoming, the autonomous control required by the new high availability services software may prevent the old high availability services software from controlling any portion of the software and/or hardware entity. In another example, the software and/or hardware entity may need a certain level of application-specific control over the management of some critical portion of the software and/or hardware entity. As another shortcoming, the autonomous control by the high availability services software may not provide the software and/or hardware entity with the desired level of application-specific control.

Thus, a need exists for a manager component that provides a software and/or hardware entity with a desired level of application-specific control.

SUMMARY

The invention in one embodiment encompasses an apparatus. The apparatus comprises a first manager component that performs one or more first management operations on a software and/or hardware entity and a second manager component that performs one or more second management operations on the software and/or hardware entity.

Yet another embodiment of the invention encompasses a method. A software and/or hardware entity is configured for partial control by a first manager component and partial control by a second manager component.

Still another embodiment of the invention encompasses an article. The article comprises one or more computer-readable signal-bearing media. The article comprises means in the one or more media for configuring a software and/or hardware entity for partial control by a first manager component and partial control by a second manager component.

DESCRIPTION OF THE DRAWING

Features of exemplary implementations of the invention will become apparent from the description, the claims, and the accompanying drawing in which:

DETAILED DESCRIPTION

Figure 1:
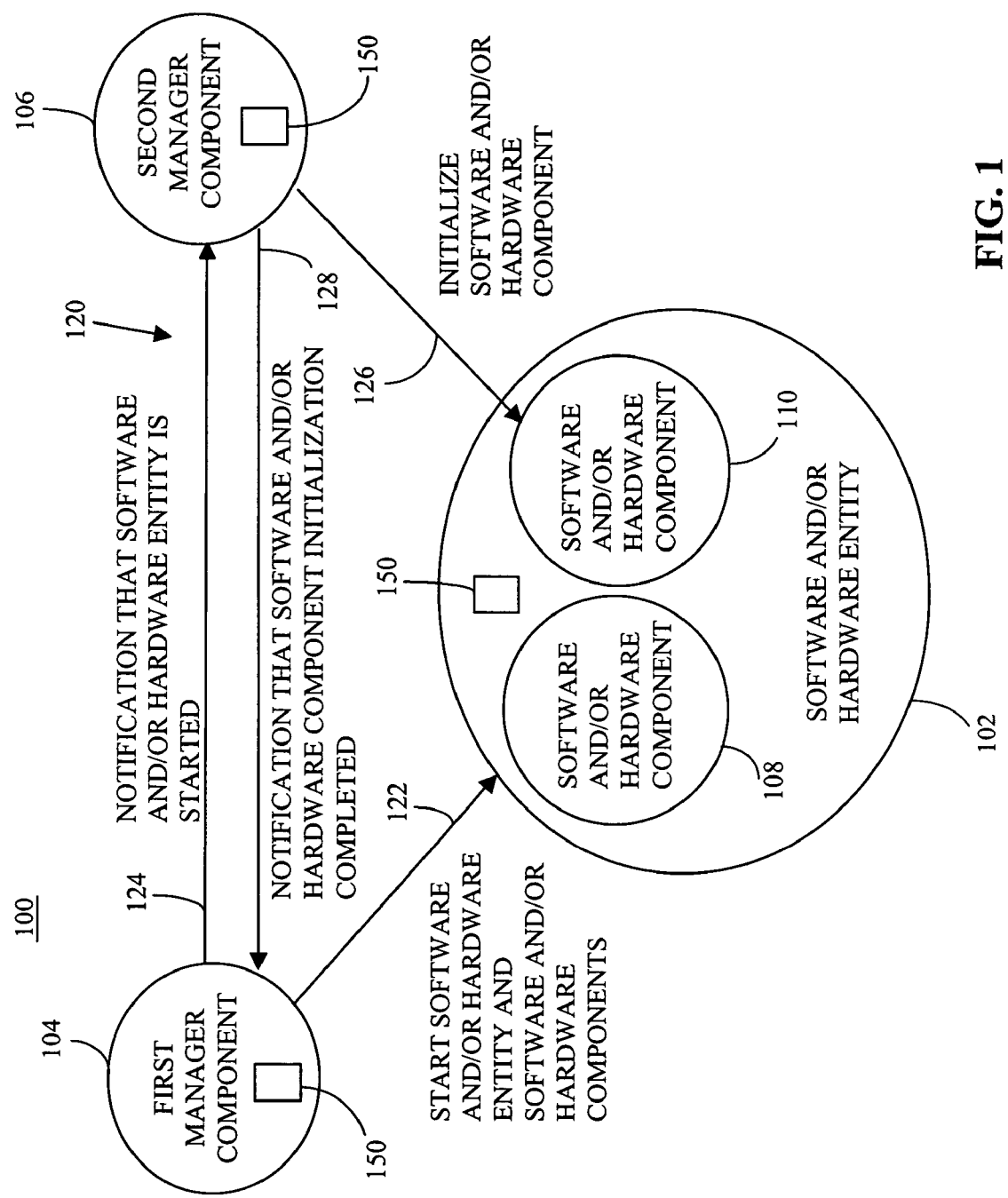
FIG. 1 is a representation of an exemplary implementation of an apparatus that comprises one or more software and/or hardware entities and a plurality of manager components.

Turning to FIG. 1, an apparatus 100 in one example comprises one or more software and/or hardware entities 102 and a plurality of manager components 104 and 106. The manager components 104 and 106 in one example share control of the software and/or hardware entity 102. For example, the manager components 104 and 106 together are responsible for starting, stopping, initializing, and monitoring the software and/or hardware entity 102, detecting failures of the software and/or hardware entity 102, recovering the software and/or hardware entity 102, propagating state changes about the software and/or hardware entity 102, and the like.

The software and/or hardware entity 102 in one example provides functionality for a computer system. In one example, the software and/or hardware entity 102 is responsible for setup and/or teardown of telecommunication connections in a telecommunication network. For example, the manager components 104 and 106 and the software and/or hardware entity 102 may cooperate to setup and/or teardown communication sessions. The software and/or hardware entity 102 in one example comprises one or more software and/or hardware components 108 and 110. For example, the software and/or hardware entity 102 may comprise tens, hundreds, or thousands of software and/or hardware components. The software and/or hardware components 108 and 110 represent software and/or hardware sub-entities of the software and/or hardware entity 102. For example, the software and/or hardware components 108 and 110 represent logical blocks of software and/or hardware of the software and/or hardware entity 102. The software and/or hardware components 108 and 110 in one example are developed independently and then put together within the software and/or hardware entity 102.

The software and/or hardware entity 102 and the manager components 104 and 106 are communicatively coupled to allow exchange of management commands and responses. Also, the manager components 104 and 106 are communicatively coupled to allow exchange of requests and notifications about management operations. The manager components 104 and 106 share responsibility for controlling the software and/or hardware entity 102. For example, each of the manager components 104 and 106 have partial control of the software and/or hardware entity 102. The software and/or hardware entity 102 comprises a hybrid software and/or hardware entity that is not under autonomous control by a single manager. In one example, two manager components each have partial control of the software and/or hardware entity 102. In another example, three or more manager components each have partial control of the software and/or hardware entity 102.

The manager components 104 and 106 divide the responsibility for management operations on the software and/or hardware components 108 and 110. In one example, both of the manager components 104 and 106 may perform management operations on the same ones of the software and/or hardware components 108 and 110. For example, the manager component 104 may perform one or more first management operations on the software and/or hardware component 108 and the manager component 106 may perform one or more second management operations on the software and/or hardware component 110. In another example, each of the manager components 104 and 106 are responsible for different ones of the software and/or hardware components 108 and 110. For example, the software and/or hardware components 108 and 110 may comprise one or more first software and/or hardware components 108 and one or more second software and/or hardware components 110. The manager component 104 in one example controls the one or more first software and/or hardware components 108. The manager component 106 in one example controls the one or more second software and/or hardware components 110.

The manager component 104 in one example performs one or more first management operations on the software and/or hardware entity 102. The manager component 106 in one example performs one or more second management operations on the software and/or hardware entity 102. To share management responsibility between the manager components 104 and 106, individual responsibilities are defined for each of the manager components 104 and 106 regarding the software and/or hardware entity 102. To keep each of the manager components 104 and 106 apprised of the activities of the other of the manager components 104 and 106, the manager components 104 and 106 exchange notifications. The manager components 104 and 106 may exchange notifications that indicate management operations that are about to take place or have already taken place. Also, upon detection by the management component 104 of an event associated with the software and/or hardware entity 102, the manager component 104 may send a notification to the manager component 106 to indicate occurrence of the event. Upon detection by the management component 106 of an event associated with the software and/or hardware entity 102, the manager component 106 may send a notification to the manager component 104 to indicate occurrence of the event.

Sending the notifications between the manager components 104 and 106 helps the manager components 104 and 106 determine the current state of the software and/or hardware entity 102 and the software and/or hardware components 108 and 110. Knowing the current state of the software and/or hardware entity 102 and the software and/or hardware components 108 and 110 allows the manager components 104 and 106 to coordinate management operations performed on the software and/or hardware entity 102 and the software and/or hardware components 108 and 110 so that the operations occur in a proper sequence. For example, the software and/or hardware entity 102 must be started before being stopped. So, the manager components 104 and 106 understand the management operation ordering required and coordinate to ensure that management operations are properly sequenced.

The manager components 104 and 106 in one example are responsible for determining their own responsibilities with regards to managing the software and/or hardware entity 102. In one example, the responsibilities are statically defined. For example, the manager components 104 and 106 access a configuration file that provides each of the manager components 104 and 106 with a list of the responsibilities. In another example, the manager components 104 and 106 dynamically negotiate the responsibilities. For example, the manager components 104 and 106 each agree to specific management operations or control of a specific portion of the software and/or hardware entity 102. The manager component 104 may send a notification to the manager component 106 to request specific responsibilities and the manager component 106 may also send a notification to the manager component 104 to request specific responsibilities.

One of the manager components 104 and 106 may send a request to another of the manager components 104 and 106 to trigger a management operation. For example, the manager component 104 may send a request to the manager component 106 to cause the manager component 106 to perform a management operation on the software and/or hardware entity 102. The manager component 106 in one example accepts the request, performs the management operation, and sends an acknowledgement or error indication to the manager component 104.

One or more of the manager components 104 and 106 in one example comprise high availability system software operating in a high availability domain. For example, the manager component 106 may operate within the high availability domain and the manager component 104 and the software and/or hardware entity 102 may operate outside of the high availability domain. The software and/or hardware components 108 and 110 of the software and/or hardware entity 102 operate outside of the high availability domain. However, the software and/or hardware entity 102 and the software and/or hardware components 108 and 110 may interact with the high availability system software in the high availability domain. So, the software and/or hardware entity 102 may exist outside of the high availability domain while still employing one or more functions of the high availability services software. The software and/or hardware entity 102 may allow connection with the management component 106 (e.g., the high availability services software) and allow connection with the management component 104 to prevent autonomous control of the software and/or hardware entity 102 by one of the management components 104 and 106, such as, the high availability services software. For example, the high availability services software is able to peer with the management component 104 to cooperatively manage the software and/or hardware entity 102 not under the exclusive control of the high availability services software.

The software and/or hardware entity 102 in one example may desire a certain level of application-specific control over the management of some critical portion of the software and/or hardware entity 102. The autonomous control by the high availability services software may not provide the software and/or hardware entity 102 with the desired level of application-specific control. To gain the desired level of application-specific control while retaining some desired management operation of the high availability services software, a first portion of the management responsibilities of the software and/or hardware entity 102 is controlled by the management component 104 and a second portion of the management responsibilities of the software and/or hardware entity 102 is controlled by the high availability services software. The partial control of the software and/or hardware entity 102 by the management component 104 may provide the software and/or hardware entity 102 with the desired level of application-specific control.

An illustrative description of one exemplary operation of the apparatus 100 is now presented, for explanatory purposes. A message flow 120 represents an exemplary startup and initialization of the software and/or hardware entity 102 by the manager components 104 and 106.

In one example, the manager component 104 is responsible for startup of the software and/or hardware entity 102. Upon determination to startup the software and/or hardware entity 102, the manager component 104 sends a startup command 122 to the software and/or hardware entity 102. The startup command 122 activates the software and/or hardware entity 102 and the software and/or hardware components 108 and 110. Upon execution of the startup command 122, the software and/or hardware entity 102 in one example sends a response to the manager component 104 to indicate success of the startup command 122. To provide an indication that the software and/or hardware entity 102 has been started, the manager component 104 sends a startup notification 124 to the manager component 106. The startup notification 124 serves to keep the manager component 106 apprised of the activities of the manager component 104 and the state of the software and/or hardware entity 102. The manager component 106 waits for the startup notification 124 before initiating management operations with the software and/or hardware entity 102.

The manager component 106 in one example is responsible for one or more management operations for the software and/or hardware entity 102. The manager component 106 in one example is responsible for initializing the software and/or hardware component 110. Upon receipt of the startup notification 124, the manager component 106 sends an initialization command 126 to the software and/or hardware component 110. Upon execution of the initialization command 126, the software and/or hardware component 110 in one example sends a response to the manager component 106 to indicate success of the initialization command 126. To provide an indication that the software and/or hardware component 110 has been initialized, the manager component 106 sends an initialization notification 128 to the manager component 104. The initialization notification 128 serves to keep the manager component 104 apprised of the activities of the manager component 106 and the state of the software and/or hardware entity 102.

The message flow 120 illustrates startup and initiation of the software and/or hardware entity 102, however, the message flow 120 is analogous to other management operations. For example, the command, response, notification message sequence between the software and/or hardware entity 102 and the manager components 104 and 106 illustrated in the message flow 120 is analogous to a message sequence for other management operations, such as, stopping the software and/or hardware entity 102, monitoring the software and/or hardware entity 102, detecting failures of the software and/or hardware entity 102, reporting the failures of the software and/or hardware entity 102, and the like.

In one example, the management component 104 detects a failure in the software and/or hardware component 108. The management component 104 sends a failure notification to the management component 106. Upon receipt of the failure notification, the management component 106 may initiate a management operation on the software and/or hardware entity 102 or another software and/or hardware entity based on the failure notification.

The apparatus 100 in one example comprises a plurality of components such as electronic components, computer hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer readable signal bearing media. One example of a computer-readable signal bearing medium for the apparatus 100 comprises one or more instances of the recordable data storage medium 150 of one or more of the manager components 104 and 106 and the software and/or hardware entities 102. For example, the recordable data storage medium 150 comprises one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A computer-readable non-transitory medium that comprises one or more of a floppy disk, magnetic tape, CD-ROM, DVD-ROM, hard disk drive, or electronic memory that stores a software program for implementation of:
   a first manager component that performs one or more first management operations on a software and/or hardware entity; and
   a second manager component that performs one or more second management operations on the software and/or hardware entity, wherein the second manager component comprises high availability services system software operating in a high availability domain;
   wherein the first management component is configured to operate outside of the high availability domain and the second management component is configured to operate within the high availability domain;
   wherein the first manager component and the second manager component are configured to concurrently share management responsibilities for the software and/or hardware entity;
   wherein the first manager component and the second manager component are configured for individual management responsibilities;
   wherein the second manager component is configured to peer with the first manager component to cooperatively manage and prevent autonomous control of the software and/or hardware entity by the second manager component.

2. The computer-readable non-transitory medium of claim 1, wherein the first manager component and the second manager component are communicatively coupled.

3. The computer-readable non-transitory medium of claim 2, wherein the first manager component and the second manager component coordinate the one or more first and second management operations to occur in a proper sequence.

4. The computer-readable non-transitory medium of claim 1, wherein upon detection by the first management component of an event associated with the software and/or hardware entity, the first manager component sends a notification to the second manager component;
   wherein upon detection by the second management component of an event associated with the software and/or hardware entity, the second manager component sends a notification to the first manager component.

5. The computer-readable non-transitory medium of claim 1, wherein the software and/or hardware entity comprises one or more software and/or hardware components;
   wherein the first manager component starts up the software and/or hardware entity and the one or more software and/or hardware components;
   wherein the first manager component sends a notification to the second manager component to indicate that the software and/or hardware entity and the one or more software and/or hardware components have been started.

6. The computer-readable non-transitory medium of claim 5, wherein the second manager component initializes one or more of the one or more software and/or hardware components;
   wherein the second manager component sends a notification to the first manager component to indicate that the one or more of the one or more software and/or hardware components have been initialized.

7. The computer-readable non-transitory medium of claim 1, wherein the first and second manager components cooperate to initialize, monitor, and detect one or more failures of the software and/or hardware entity and one or more of the one or more software and/or hardware components;
   wherein the first and second manager components dynamically negotiate the individual management responsibilities.

8. The computer-readable non-transitory medium of claim 7, wherein the first and second manager components cooperate to recover the software and/or hardware entity from the one or more failures.

9. The computer-readable non-transitory medium of claim 1, wherein the first manager component sends a request to the second manager component to cause the second manager component to perform a management operation of the one or more second management operations on the software and/or hardware entity.

10. The computer-readable non-transitory medium of claim 1, in combination with the software and/or hardware entity, wherein the high availability services software comprises the one or more second management operations;
    wherein the software and/or hardware entity operates outside of the high availability domain, wherein the software and/or hardware entity interacts with the high availability domain.

11. The computer-readable non-transitory medium of claim 10, wherein the software and/or hardware entity is connected with the high availability domain to employ one or more of the one or more second management operations of the high availability services software.

12. The computer-readable non-transitory medium of claim 11, wherein the software and/or hardware entity is connected with the first manager component to employ one or more of the one or more first management operations and to prevent autonomous control of the software and/or hardware entity by the high availability services software.

13. The computer-readable non-transitory medium of claim 1, in combination with the software and/or hardware entity, wherein the first manager component, the second manager component, and the software and/or hardware entity are responsible for one or more of setup and teardown of telecommunication connections.

14. The computer-readable non-transitory medium of claim 1, wherein the software and/or hardware entity comprises one or more first software and/or hardware components and one or more second software and/or hardware components;
    wherein the first manager component controls the one or more first software and/or hardware components;
    wherein the second manager component controls the one or more second software and/or hardware components.

15. The computer-readable non-transitory medium of claim 1, wherein the first manager component and/or the second manager component access a configuration file to determine the individual management responsibilities of each of the first and second manager components.

16. A method, comprising the steps of:
    executing software stored in memory by a processor;
    configuring a software and/or hardware entity for concurrent partial control by a first manager component and a second manager component, wherein the second manager component comprises high availability services system software operating in a high availability domain, wherein the first manager component and the second manager component are configured for individual management responsibilities, wherein the first management component is configured to operate outside of the high availability domain and the second management component is configured to operate within the high availability domain;
    peering the first manager component with the second manager component to cooperatively manage and prevent autonomous control of the software and/or hardware entity by the second manager component.

17. The method of claim 16, wherein the step of configuring the software and/or hardware entity for partial control by the first manager component and partial control by the second manager component comprises the step of:
    allowing the software and/or hardware entity to accept one or more first management operations from the first manager component and one or more second management operations from the second manger component, wherein the first and second manager components cooperate to initialize, monitor, and detect failures of the software and/or hardware entity.

18. The method of claim 16, wherein the second manager component comprises high availability services software operating in a high availability domain, the method further comprising the steps of:
    operating the software and/or hardware entity outside of the high availability domain; and
    connecting the software and/or hardware entity with the high availability services software within the high availability domain.

19. The method of claim 16, further comprising the step of:
    sending one or more notifications between the first manager component and the second manager component to indicate occurrence of one or more events associated with the software and/or hardware entity.

20. The method of claim 16, wherein the software and/or hardware entity comprises one or more first software and/or hardware components, wherein the step of configuring the software and/or hardware entity for partial control by the first manager component and partial control by the second manager component comprises the steps of:
    connecting the one or more first software and/or hardware components with the first manager component to employ one or more first management operations of the first manager component; and
    connecting the one or more second software and/or hardware components with the second manager component to employ one or more second management operations of the second manager component and to prevent autonomous control of the software and/or hardware entity by the first manager component.

21. An article, comprising:

one or more computer-readable non-transitory media consisting of one or more of a floppy disk, magnetic tape, CD-ROM, DVD-ROM, hard disk drive, or electronic memory; and means in the one or more media for configuring a software and/or hardware entity for concurrent partial control by a first manager component and a second manager component, wherein the second manager component comprises high availability services system software operating in a high availability domain, wherein the first manager component and the second manager component are configured for individual management responsibilities, wherein the first management component is configured to operate outside of the high availability domain and the second management component is configured to operate within the high availability domain;

means in the one or more media for peering the first manager component with the second manager component to cooperatively manage and prevent autonomous control of the software and/or hardware entity by the second manager component.

* * * * *